(12) United States Patent
Chaen et al.

(10) Patent No.: US 11,916,320 B2
(45) Date of Patent: Feb. 27, 2024

(54) BUS BAR

(71) Applicant: Yazaki Corporation, Tokyo (JP)

(72) Inventors: Takahiro Chaen, Shizuoka (JP); Yasuhiro Yamaguchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 50 days.

(21) Appl. No.: 17/880,242

(22) Filed: Aug. 3, 2022

(65) Prior Publication Data

US 2023/0038828 A1 Feb. 9, 2023

(30) Foreign Application Priority Data

Aug. 6, 2021 (JP) ................. 2021-129484

(51) Int. Cl.
  *H01R 11/01* (2006.01)
  *H01B 5/02* (2006.01)
  *H01R 11/09* (2006.01)

(52) U.S. Cl.
  CPC ............... *H01R 11/01* (2013.01); *H01B 5/02* (2013.01); *H01R 11/09* (2013.01)

(58) Field of Classification Search
  CPC ... H01B 7/02; H01B 7/04; H01B 7/06; H01B 7/018; H01B 7/081; H01R 5/02; H01R 11/01; H01R 11/09
  USPC ........ 174/36, 70 B, 90 B, 112, 117 R, 117 F, 174/117 FF
  See application file for complete search history.

(56) References Cited

U.S. PATENT DOCUMENTS

| 3,476,871 | A  | * | 11/1969 | Erdle ..................... H02G 5/005 174/117 FF |
| 2010/0327654 | A1 | * | 12/2010 | Azuma ................. H05K 7/1432 307/9.1 |
| 2014/0000927 | A1 | * | 1/2014  | Hashimoto ............ H01B 13/06 174/68.2 |
| 2018/0151862 | A1 |   | 5/2018  | Bessho et al. |
| 2021/0203040 | A1 |   | 7/2021  | Okada et al. |
| 2021/0210821 | A1 |   | 7/2021  | Okada et al. |
| 2022/0181747 | A1 |   | 6/2022  | Yanagida et al. |

FOREIGN PATENT DOCUMENTS

| EP | 3 065 198 A1 | 9/2016 |
| EP | 3 780 150 A1 | 2/2021 |
| JP | 11-297372 A | 10/1999 |
| JP | 2001-286028 A | 10/2001 |
| JP | 2009-158359 A | 7/2009 |
| JP | 2013-191337 A | 9/2013 |
| JP | 2019-036475 A | 3/2019 |
| WO | 2020/241412 A1 | 12/2020 |

* cited by examiner

*Primary Examiner* — William H. Mayo, III
(74) *Attorney, Agent, or Firm* — Sughrue Mion, PLLC

(57) ABSTRACT

A bus bar includes members made from a conductive material and consecutively arranged to form a plate shape defining a wiring pathway. The members adjacent to each other have connection surfaces at which the members adjacent to each other are connected to each other by laser joining. The members adjacent to each other include at least one tolerance buffer between the members adjacent to each other. In the at least one tolerance buffer, the connection surfaces of the members adjacent to each other have different widths.

6 Claims, 3 Drawing Sheets

BUS BAR

CROSS REFERENCE TO RELATED APPLICATION

The present application is based on, and claims priority from the prior Japanese Patent Application No. 2021-129484, filed on Aug. 6, 2021, the entire contents of which are incorporated herein by reference.

TECHNICAL FIELD

The disclosure relates to a bus bar.

BACKGROUND

JP 2001-286028 A proposes a bus bar in which a wiring pathway is formed of a single member made from a conductive material. The single member is formed in a shape along the wiring pathway by performing press working on a single flat plate shaped base material. Alternatively, the single member is formed in a shape along the wiring pathway by performing a forming process on a single linear base material.

SUMMARY

In the bus bar above in which a single member is processed to form a wiring pathway, when the wiring pathway is designed to be complicated, for example, manufacturing tolerances may be generated and thus the dimensional accuracy with respect to the wiring pathway may be reduced.

The disclosure is directed to a bus bar capable of improving the dimensional accuracy with respect to a wiring pathway.

A bus bar in accordance with some embodiments includes members made from a conductive material and consecutively arranged to form a plate shape defining a wiring pathway. The members adjacent to each other have connection surfaces at which the members adjacent to each other are connected to each other by laser joining. The members adjacent to each other include at least one tolerance buffer between the members adjacent to each other. In the at least one tolerance buffer, the connection surfaces of the members adjacent to each other have different widths.

According to the aforementioned configuration, it is possible to improve the dimensional accuracy with respect to a wiring pathway.

DETAILED DESCRIPTION

Figure 1:
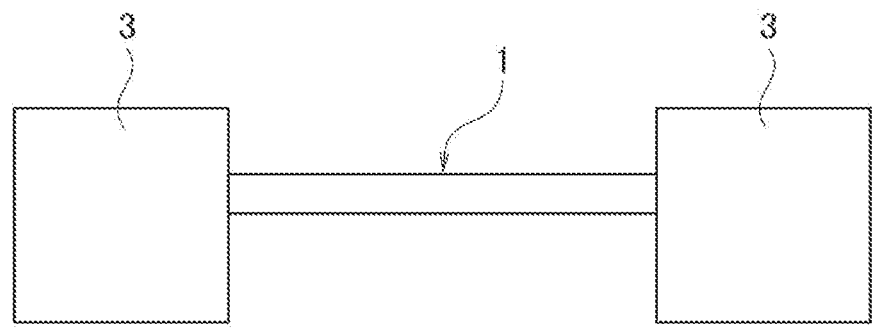
FIG. 1 is a block diagram of a bus bar according to an embodiment applied between different battery stacks.

Various embodiments will be described hereinafter with reference to the accompanying drawings.

A detailed description will be hereinbelow provided for a bus bar 1 according to an embodiment by referring to the drawings. Noted that the proportions of the dimensions of the drawings are exaggerated for illustration purposes and therefore the proportions may be different from actual ones.

Figure 2:
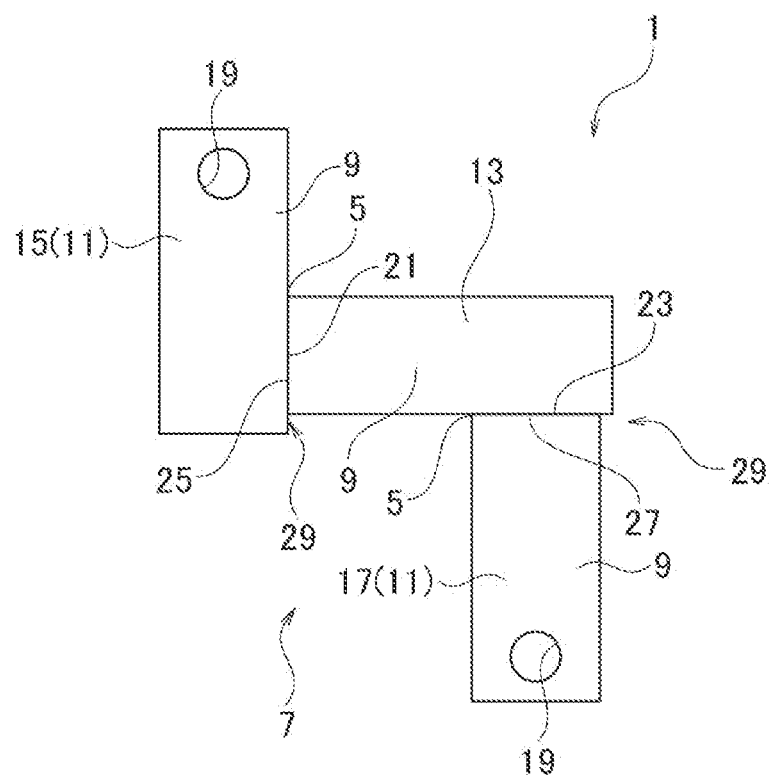
FIG. 2 is a plan view of an example of the bus bar according to the embodiment.

As illustrated in FIGS. 1 and 2, the bus bar 1 according to the embodiment is made from a conductive material and electrically connects between different battery stacks 3 mounted on a vehicle, for example. The bus bar 1 includes a wiring pathway 7 having bent portions 5 to avoid interference with non-illustrated peripheral members arranged between the battery stacks 3. The wiring pathway 7 includes plate shaped members 9 consecutively arranged. The members 9 include connection members 11 and a conductive member 13.

The connection members 11 include a first connection member 15 and a second connection member 17 arranged at both ends of the wiring pathway 7. Connection portions 19 electrically connected to the battery stacks 3 are provided in the first connection member 15 and the second connection member 17, respectively. The connection portions 19 are fastening portions to which non-illustrated fastening members such as bolts are fastened, for example.

The first connection member 15 and the second connection member 17 are made from copper which has excellent electrical connection to the battery stacks 3 and is suitable for fastening of the fastening members, for example. The first connection member 15 and the second connection member 17 may be made from copper alloy composed mainly of copper. The first connection member 15 and the second connection member 17 may be made from 6000 series aluminum alloy composed mainly of aluminum which has excellent electrical connection to the battery stacks 3 and is suitable for fastening of the fastening members, for example. In this way, the material for the connection members 11 may be any materials as long as it has excellent conductivity and excellent stiffness.

The first connection member 15 and the second connection member 17 are respectively formed in a quadrangular plate shape by press working or a forming process. The first connection member 15 and the second connection member 17 are readily processable due to their simple quadrangular shape, thereby reducing the manufacturing cost. In the embodiment, the first connection member 15 and the second connection member 17 have the same plate thickness, the same plate width, and the same plate length. Thus, the first connection member 15 and the second connection member 17 can be formed by the same processing method, thereby reducing the manufacturing cost even more. The first connection member 15 and the second connection member 17 may be made from different materials and have different plate thicknesses, different plate widths, and different plate lengths. The conductive member 13 is arranged between the first connection member 15 and the second connection member 17.

The conductive member 13 is arranged between the first connection member 15 and the second connection member 17 in the wiring pathway 7. The conductive member 13 is made from copper as with the connection members 11. The conductive member 13 may be made from copper alloy composed mainly of copper. When the connection members 11 are made from aluminum alloy composed mainly of aluminum, for example, the conductive member 13 may be made from the same aluminum alloy.

The conductive member 13 is formed in a quadrangular plate shape by press working or a forming process. The conductive member 13 is readily processable due to its simple quadrangular shape, thereby reducing the manufacturing cost. In the embodiment, the conductive member 13 and the connection members 11 have the same plate thickness, the same plate width, and the same plate length. Thus, the conductive member 13 and the connection members 11 can be formed by the same processing method, thereby reducing the manufacturing cost even more. The conductive member 13 and the connection members 11 may have different plate thicknesses, different plate widths, and different plate lengths. For example, the plate width of the conductive member 13 may be larger than the plate width of the respective connection members 11 in order to improve heat dissipation of the conductive member 13 with the increased surface area.

The conductive member 13 may be formed to have the bent portions 5 in the wiring pathway 7. When the conductive member 13 is provided with the bent portions 5, the conductive member 13 may be made from 1000 series aluminum alloy composed mainly of aluminum which is softer than and superior in formability to the connection members 11, for example. The plate thickness of the conductive member 13 may be less than the plate thickness of the connection members 11 in order to reduce the stiffness of the conductive member 13 with increased formability. In this way, the increased formability of the conductive member 13 allows processing for forming the bent portions 5 in the conductive member 13 to be easily carried out, thereby reducing the manufacturing cost.

Figure 3:
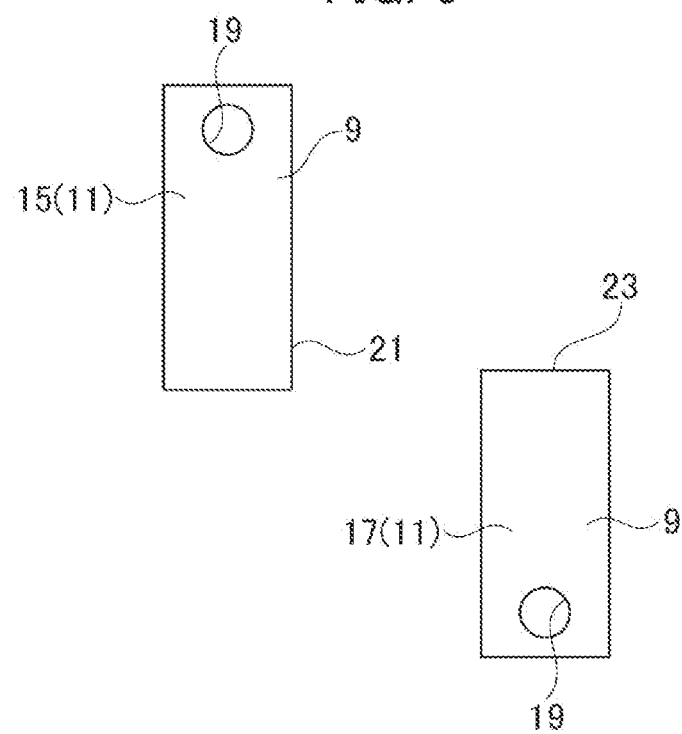
FIG. 3 is a plan view of arranged connection members of the bus bar according to the embodiment.

The members 9 including the conductive member 13 and the connection members 11 described above are arranged along the wiring pathway 7 and the portions in contact with each other are connected to each other by laser joining. An example of the connection of the members 9 in the bus bar 1 is described below. First, as illustrated in FIG. 3, the first connection member 15 and the second connection member 17 are arranged such that the positions of the connection portions 19 are fixed at prescribed positions. In this state, a connection surface 21 which is one end surface of the first connection member 15 in the width direction thereof and a connection surface 23 which is one end surface of the second connection member 17 in the length direction thereof are away from each other.

Next, as illustrated in FIG. 2, the conductive member 13 is arranged such that a connection surface 25 which is one end surface of the conductive member 13 in the length direction thereof is in contact with the connection surface 21 of the first connection member 15, and a connection surface 27 which is one end surface of the conductive member 13 in the width direction thereof is in contact with the connection surface 23 of the second connection member 17. Then, the portions at which the connection surfaces 21, 25 are located are connected to each other by laser joining, and the portions at which the connection surfaces 23, 27 are located are connected to each other by laser joining. The connection of the first connection member 15, the conductive member 13, and the second connection member 17 forms the bent portions 5 in the wiring pathway 7.

In this way, the wiring pathway 7 having the bent portions 5 can be formed by consecutively connecting the members 9 to each other by laser joining. Thus, there is no need to form a single member in a shape along the wiring pathway 7 by press working or a forming process and it is possible to easily correspond with wiring pathways 7 having various shapes. When the connection members 11 and the conductive member 13 are made from different types of metal such as copper and aluminum, an intermetallic compound may be generated at the connection portions thereof, causing the joint strength to decrease. Thus, when the connection members 11 and the conductive member 13 are made from different types of metal, a clad member including the same types of metal as the connection members 11 and the conductive member 13 may be interposed between the connection members 11 and the conductive member 13.

Figure 4:
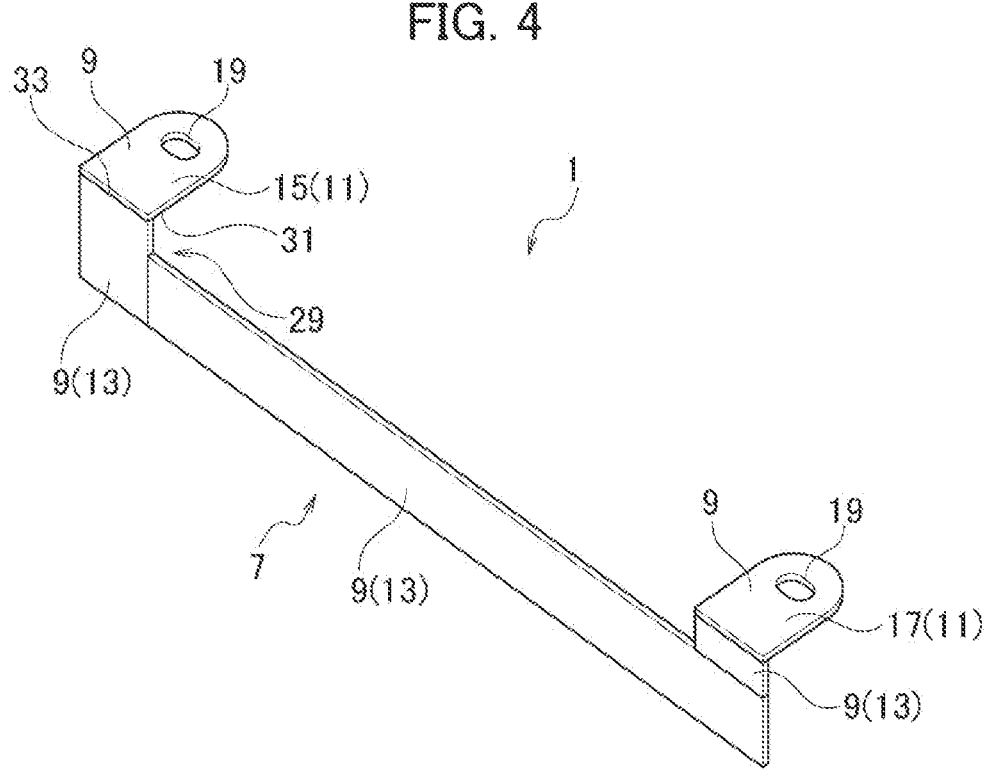
FIG. 4 is a perspective view of another example of the bus bar according to the embodiment.
Figure 5:
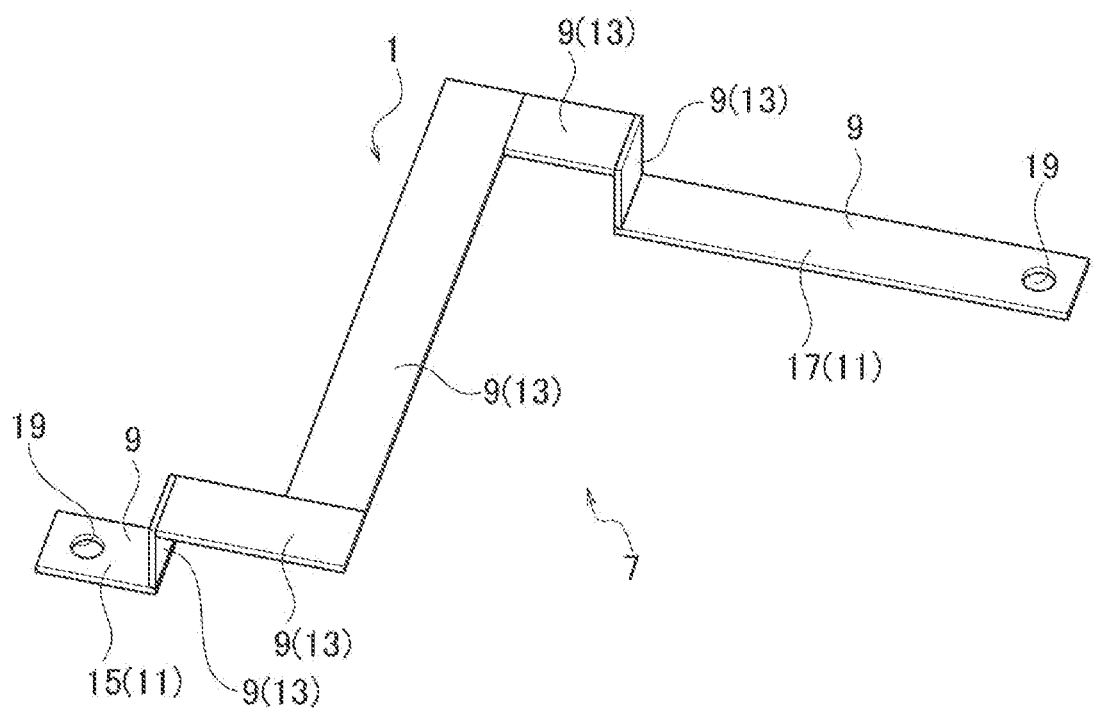
FIG. 5 is a perspective view of yet another example of the bus bar according to the embodiment.
Figure 6:
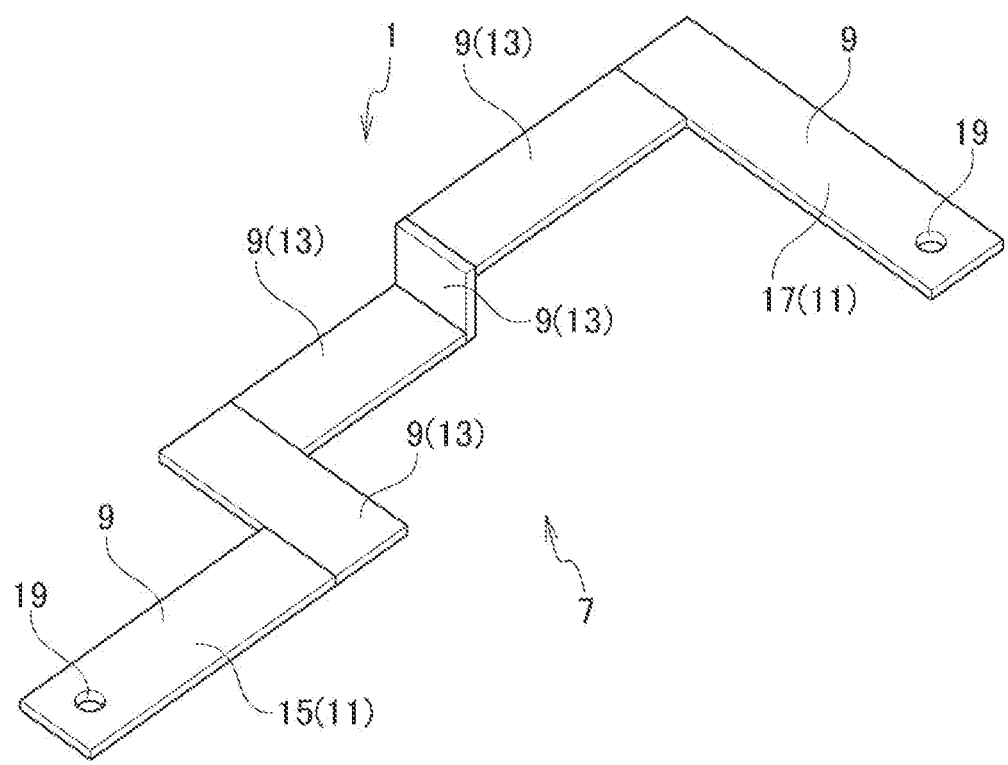
FIG. 6 is a perspective view of still yet another example of the bus bar according to the embodiment.

In the bus bar 1 described above, the members 9 are arranged in the same plane. However, the present invention is not limited to this. For example, as illustrated in FIGS. 4 to 6, the members 9 may be arranged three-dimensionally and consecutively connected to each other by laser joining in order to correspond with the three-dimensional wiring pathway 7. The bend angles at the bent portions 5 are not limited to 90 degrees. The bend angles at the bent portions 5 may be less than 90 degrees or more than 90 degrees in accordance with the bend shape of the wiring pathway 7.

In the first connection member 15 and the second connection member 17 which are arranged at both ends of the wiring pathway 7, the connection portions 19 need to be positioned to correspond to fixed points such as the different battery stacks 3. However, when a single member is processed to form the wiring pathway 7 so as to be along the wiring pathway 7, the positions of the connection portions 19 may be displaced due to manufacturing tolerances. For solving this problem, tolerance buffers 29 are provided in the connection portions of the members 9 in the embodiment.

In the tolerance buffer 29 at the connection portion of the first connection member 15 and the conductive member 13, the width of the connection surface 21 of the first connection member 15 and the width of the connection surface 25 of the conductive member 13 are different from each other. The connection surface 21 of the first connection member 15 is the end surface facing the conductive member 13 in the width direction of the first connection member 15, and includes the plate length of the first connection member 15. The connection surface 25 of the conductive member 13 is the end surface facing the first connection member 15 in the length direction of the conductive member 13, and includes the plate width of the conductive member 13. In the tolerance buffer 29, even when a tolerance is generated in the length direction of the first connection member 15, the tolerance can be absorbed by moving the conductive member 13 in the length direction of the first connection member 15 with respect to the connection surface 21 of the first connection member 15. The plate length of the first connection member 15 is equal to or longer than a prescribed length corresponding to the wiring pathway 7. Thus, even if the conductive member 13 is arranged to the lower side in FIG. 2, for example, a lack of room for connection of the connection surface 25 of the conductive member 13 to the connection surface 21 of the first connection member 15 is not caused, thereby enabling retention of the connection strength.

In the tolerance buffer 29 at the connection portion of the conductive member 13 and the second connection member 17, the width of the connection surface 27 of the conductive member 13 and the width of the connection surface 23 of the second connection member 17 are different from each other. The connection surface 27 of the conductive member 13 is the end surface facing the second connection member 17 in the width direction of the conductive member 13, and includes the plate length of the conductive member 13. The connection surface 23 of the second connection member 17 is the end surface facing the conductive member 13 in the length direction of the second connection member 17, and includes the plate width of the second connection member 17. In the tolerance buffer 29, even when a tolerance is generated in the width direction of the second connection member 17, the tolerance can be absorbed by moving the conductive member 13 in the width direction of the second connection member 17 with respect to the connection surface 23 of the second connection member 17. The plate length of the conductive member 13 is equal to or longer than a prescribed length corresponding to the wiring pathway 7. Thus, even if the conductive member 13 is arranged to the left side in FIG. 2, for example, a lack of room for connection of the connection surface 27 of the conductive member 13 to the connection surface 23 of the second connection member 17 is not caused, thereby enabling retention of the connection strength.

In the tolerance buffers 29 described above, the planar direction of the tolerance buffer 29 including the connection surfaces 21, 25 and the planar direction of the tolerance buffer 29 including the connection surfaces 23, 27 intersect one another. Specifically, the planar direction of the tolerance buffer 29 including the connection surfaces 21, 25 and the planar direction of the tolerance buffer 29 including the connection surfaces 23, 27 are mutually perpendicular. Intersection of the planar directions in the tolerance buffers 29 enables absorption of tolerances in the directions which intersect one another.

In this way, provision of the tolerance buffers 29 in the bus bar 1 enables absorption of manufacturing tolerances in the wiring pathway 7. Thus, it is possible to correspond with wiring pathways 7 having various shapes without variation in the dimensional accuracy. Particularly, it is possible to retain the electrical connection reliability without displacement of the positions of the connection portions 19 of the connection members 11.

Absorption of tolerances by the tolerance buffers 29 is not limited to a case where the members 9 are arranged in the same plane, and can be also applied to a case such as the bus bar 1 illustrated in FIGS. 4 to 6 where the members 9 are arranged three-dimensionally. For example, in the bus bar 1 illustrated in FIG. 4, the tolerance buffer 29 can be applied to the connection surface 31 of the first connection member 15 and the connection surface 33 of the conductive member 13 at the connection portion of the first connection member 15 and the conductive member 13. The connection surface 31 of the first connection member 15 is the end surface facing the conductive member 13 in the plate thickness direction of the first connection member 15 (the lower surface in FIG. 4), and includes the plate length of the first connection member 15. The connection surface 33 of the conductive member 13 is the end surface facing the first connection member 15 in the length direction of the conductive member 13, and includes the plate thickness of the conductive member 13. In the tolerance buffer 29, even when a tolerance is generated in the length direction of the first connection member 15, the tolerance can be absorbed by moving the conductive member 13 in the length direction of the first connection member 15 with respect to the connection surface 31 of the first connection member 15. Noted that a tolerance in the width direction of the first connection member 15 can be absorbed by the tolerance buffer 29 including the connection surfaces 31, 33 in a case where the plate width of the conductive member 13 is larger than the plate width of the first connection member 15.

The bus bar 1 described above includes the members 9 which are made from a conductive material and consecutively arranged to form a plate shape defining the wiring pathway 7. The members 9 adjacent to each other are connected to each other by laser joining. The tolerance buffers 29 are provided between the members 9 adjacent to each other, and in each of the tolerance buffers 29 the connection surfaces of the members 9 adjacent to each other have different widths.

Thus, manufacturing tolerances generated when the wiring pathway 7 is formed with a single member can be absorbed by the tolerance buffers 29. Accordingly, it is possible to improve the dimensional accuracy with respect to the wiring pathway 7 in the bus bar 1 described above.

The members 9 include at least three members 9. The tolerance buffers 29 are provided in at least two sites between the members 9 adjacent to each other. The planar directions of the connection surfaces in the tolerance buffers 29 intersect one another. Thus, it is possible to absorb tolerances in the directions which intersect one another.

The planar directions of the connection surfaces in the tolerance buffers 29 are mutually perpendicular. Thus, it is possible to absorb tolerances in the directions which are mutually perpendicular.

The members 9 located at both ends of the wiring pathway 7 are the connection members 11 having the connection portions 19 for electrical input-output. Thus, absorption of tolerances by the tolerance buffers 29 enables retention of the electrical connection reliability without displacement of the positions of the connection portions 19.

The connection portions 19 are the fastening portions to which the fastening members are fastened. Thus, absorption of tolerances by the tolerance buffers 29 enables stable fastening of the fastening members and thus retention of the electrical connection reliability without displacement of the positions of the connection portions 19 which correspond to the fixed points.

The bus bar 1 according to the embodiment electrically connects the different battery stacks 3 to each other. However, the present invention is not limited to this. For example, the bus bar 1 may be arranged between any electric components, for example, between a power source and a device and between a device and a device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A bus bar comprising:
   members made from a conductive material and consecutively arranged to form a plate shape defining a wiring pathway, wherein
   the members adjacent to each other have connection surfaces at which the members adjacent to each other are connected to each other by laser joining, and
   the members adjacent to each other include at least one tolerance buffer between the members adjacent to each other, the connection surfaces of the members adjacent to each other having different widths in the at least one tolerance buffer.

2. The bus bar according to claim 1, wherein
   the members includes at least three of the members,
   the at least one tolerance buffer includes at least two tolerance buffers, the members adjacent to each other include the tolerance buffers each between each of two pairs of the members adjacent to each other, and planar directions of the connection surfaces in the tolerance buffers intersect one another.

3. The bus bar according to claim 2, wherein the planar directions of the connection surfaces in the tolerance buffers are mutually perpendicular.

4. The bus bar according to claim 1, wherein the members located at both ends of the wiring pathway are connection members having connection portions for electrical input-output.

5. The bus bar according to claim 4, wherein the connection portions are fastening portions to which fastening members are fastened.

6. The bus bar according to claim 1, wherein the members include first and second connection members and a conductive member therebetween, the first connection member has a first connection surface at one end surface thereof in a width direction of the first connection member, the second connection member has a second connection surface at one end surface thereof in a length direction of the second connection member, the conductive member is arranged such that a third connection surface, which is one end surface of the conductive member in the length direction thereof, is in contact with the first connection surface of the first connection member and laser joined thereto, and a fourth connection surface, which is a second end surface of the conductive member in the width direction thereof, is in contact with the second connection surface of the second connection member and laser joined thereto, the members adjacent to each other have connection surfaces at which the members adjacent to each other are connected to each other by laser joining, and the first and third connection surfaces have different widths and the second and fourth connection surfaces have different widths to act as tolerance buffers.

* * * * *